Dec. 23, 1969  K. H. SENNOWITZ  3,485,990
ELECTRICAL DISCHARGE MACHINING POWER SUPPLY CIRCUIT
Filed March 28, 1967  3 Sheets-Sheet 1

INVENTOR.
Kurt H. Sennowitz
BY
Harry R Dumont
ATTORNEY.

INVENTOR.
Kurt H. Sennowitz
BY
Harry R. Dumont
ATTORNEY.

United States Patent Office 3,485,990
    Patented Dec. 23, 1969

3,485,990
    ELECTRICAL DISCHARGE MACHINING POWER SUPPLY CIRCUIT
    Kurt H. Sennowitz, Royal Oak, Mich., assignor by mesne assignments, to Elox Inc., Troy, Mich., a corporation of Delaware
    Filed Mar. 28, 1967, Ser. No. 626,571
    Int. Cl. B23k 9/16
    U.S. Cl. 219—69                                11 Claims

ABSTRACT OF THE DISCLOSURE

A circuit for providing EDM machining pulses from a direct-current source by supplying short gap-voltage-lowering (gap-deionizing) pulses from a triggering circuit coupled to the gap by a transformer whose secondary is connected across the gap in series with a current-limiting capacitor or diode.

---

The field to which my invention relates is that known as electrical discharge machining in which material is removed from an electrically conductive workpiece by the action of electrical gap discharges between a tool electrode and the workpiece. An electrode servo feed system is employed to maintain an optimum gap spacing between electrode and workpiece as metal removal progresses. A dielectric coolant is circulated continuously through the gap during machining operation.

I have found that for low electrode wear machining, which may be achieved with certain electrode materials, it is required that high current, relatively long on-time pulses be employed in connection with a gap polarity whereby the electrode is positive and the workpiece negative.

Summary of the invention

My invention provides for the use of a pulsed, semiconductor controlled rectifier connected through a transformer across the machining gap to provide short duration power supply turn-off spikes by periodically turning off the gap responsive to switching of the controlled rectifier. A further feature of my invention is the provision of a power supply circuit adapted for both rough and finishing operation. Turn-on and turn-off are precisely controlled by a multivibrator pulse source and a second controlled rectifier.

Description

Figure 1:
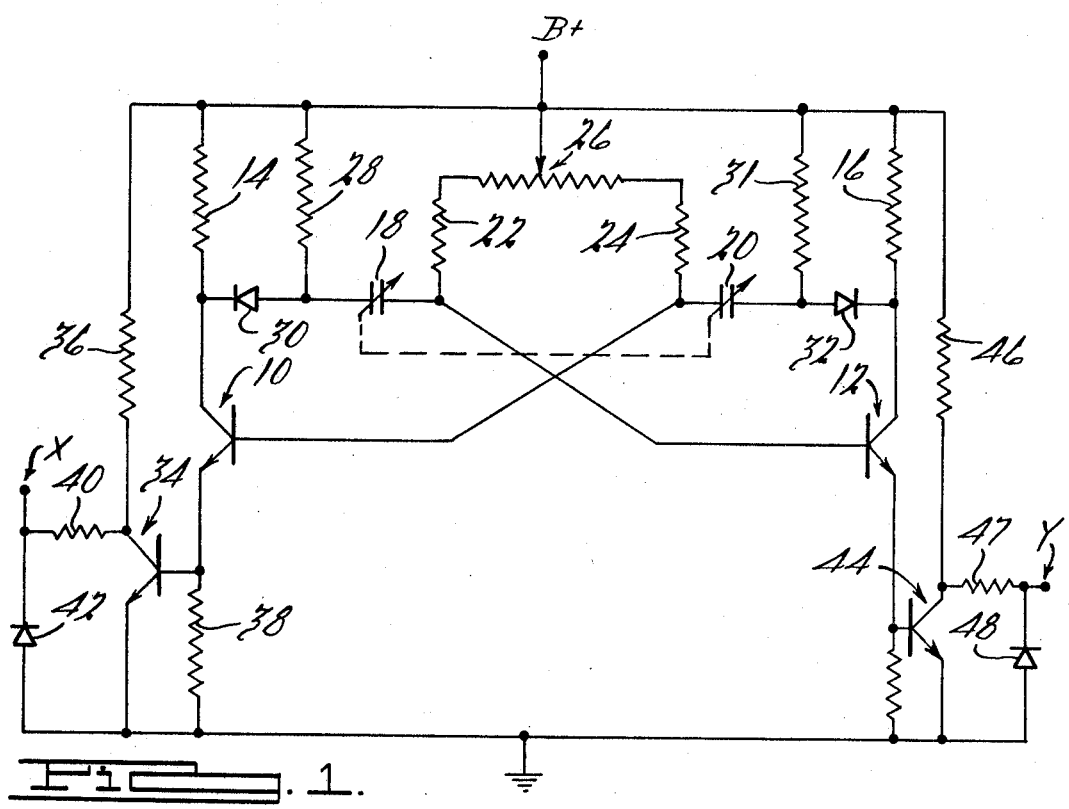
FIGURE 1 is a schematic of the pulsing means for the controlled rectifiers embodied as an astable multivibrator.

Referring now to the drawing of FIGURE 1, an astable multivibrator is shown which is particularly suitable as a pulse source in conjunction with my machining circuit. NPN transistors 10 and 12 are the switching transistors with emitter bias furnished from a B+ voltage source through resistors 14, 16, respectively. Cross coupling is through the networks including variable capacitors 18, 20 which may be selectively adjusted to control pulse output frequency. Fixed resistors 22, 24 and the variable resistance of potentiometer 26 are included to control base return and pulse on-off time. Frequency and pulse on-off ratio may be varied one independently of the other. Also included in the circuit are the diode-resistor networks comprising resistor 28, diode 30 and resistor 31, diode 32 for aiding in the provision of a true square wave output. Transistor 34 is connected to load resistor 36 and resistor 38 as shown and is directly driven by the output of transistor 10 to provide maximum pulse output power through resistor 40 to terminal X. Diode 42 is included to clip excessive negative spikes from the gate to cathode of that triggered silicon controlled rectifier which is coupled to terminal X. Similarly, transistor 44 is connected to the B+ voltage source through resistor 46 and driven directly by the output of transistor 12. The amplified output of transistor 44 is connected through resistor 47 to the terminal Y. Diode 48 is connected to clip excessive spikes from the gate to cathode of the triggered controlled rectifier which is connected to terminal Y.

Figure 2:
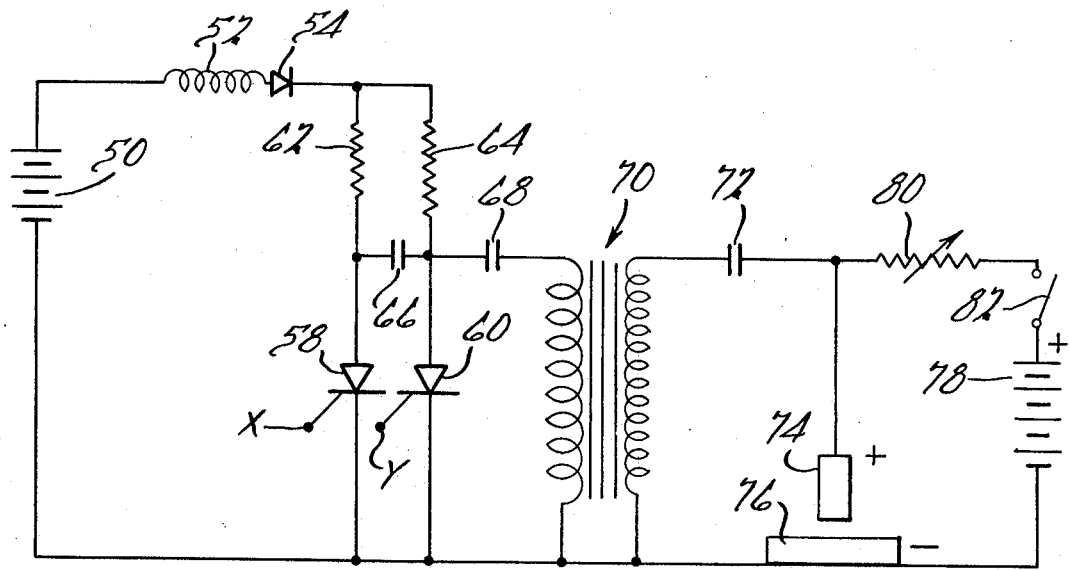
FIGURE 2 is a schematic of a preferred form of my invention.

FIGURE 2 shows one form of my invention operable in conjunction with the multivibrator of FIGURE 1. The X, Y triggering input terminals for the controlled rectifiers conform to those shown in FIGURE 1. A power supply 50 is provided in series with inductor 52 and diode 54 for operating controlled rectifiers 58, 60. Series resistors 62, 64 are connected to the anodes of controlled rectifiers 58, 60, respectively. A commutating capacitor 66 is connected in series between the anodes of controlled rectifiers 58, 60. A second capacitor 68 is in series with the primary winding of transformer 70. The output stage includes the secondary winding of transformer 70 and capacitor 72 connected across the machining gap comprising electrode 74 and workpiece 76. A second power source 78 is connectible in series with current limiting resistor 80 through the operation or switch 82 for roughing operation at high metal removal rates as will be explained hereinafter. The circuit is operable in the finishing mode with narrow, low current pulses when switch 82 is in its open position as shown.

The description of operation will now be made with reference to a roughing operation. My invention relates to the use of those electronic switches which fall in the class of electronic triggering devices. By "electronic triggering device," I mean an electronic switch having at least a pair of principal electrodes and a gate or control electrode which switch is triggered into conduction by application of a pulse of the appropriate polarity to its control or gate electrode. The electronic triggering device is further characterized as one which when triggered into conduction remainss conducting until the voltage at one of its principal electrodes is reversed or interrupted. Examples of electronic triggering devices are thyratrons, silicon controlled recatifiers and ignitrons.

The machinging pulse on-time may be regulated by the setting of the multivibrator of FIGURE 1 by the adjustment of potentiometer 26. Frequency may be preselected by the magnitude of capacitors 18 and 20. Tapped capacitor switches may be employed where a number of exact frequency settings are desired. It is possible to operate the circuit of FIGURE 2 with very long on-time, i.e., with duty factor of the order of 98–99%.

In the operation of the circuit, positive triggering pulses are applied alternately to the gates of controlled rectifiers 58, 60 at terminals X, Y. When a positive triggering pulse is applied to the gate of controlled rectifier 58, it conducts current through resistor 62 to charge capacitor 66 from power source 50. Because of the action of inductor 52, capacitor 66 can charge to a relatively high voltage from source 50 through hold-off diode 54. Diode 54 isolates capacitors 66, 68 and transformer 70 from power source 50 until triggering of the controlled rectifiers. Capacitor 68 becomes charged to the same voltage level as capacitor 66. When a positive pulse is applied to the gate of controlled rectifier 60, it will conduct and discharge capacitor 66 in series with a controlled rectifier 58 across controlled rectifier 60. Current will be shunted from controlled rectifier 58 for a 10 to 20 microsecond period necessary to turn off controlled rectifier 58. Capacitor 68 will also be discharged to provide a pulse across the primary of transformer 70. With switch 82 in its closed position for roughing, high current operation, a pulse of opposite polarity will charge capacitor 72 to the voltage of source 78. On the next pulse reversal, capacitor 72 discharges into the arc to turn off voltage supply 78 and extinguish the arc. This mode of operation provides a few microseconds off-time to give a duty factor of the order of 98–99%.

In finish machining operations, switch 82 is opened to disconnect source 78 from across the machining gap. The gap is then pulsed by narrow on-time, low current pulses for fine finishing of the workpiece 76.

Figure 3:
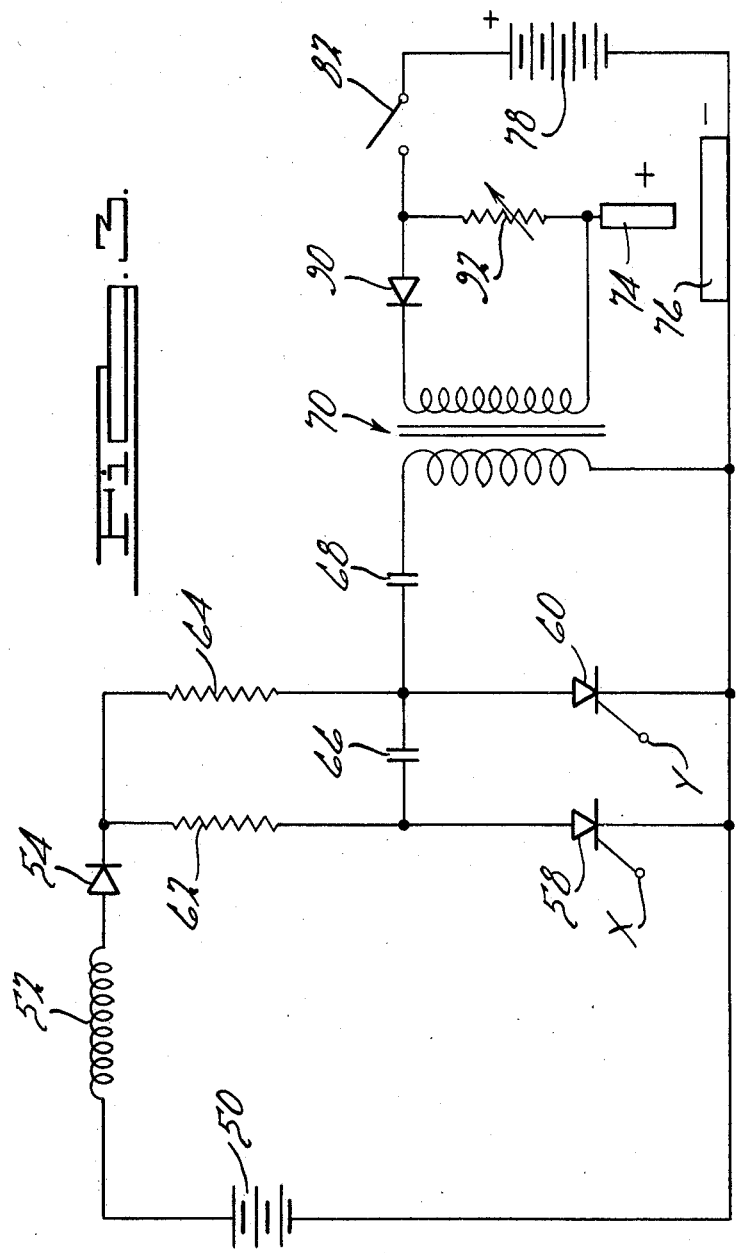
FIGURES 3–5 are schematics of alternate forms of my invention.

The circuit of FIGURE 3 is substantially similar to that of FIGURE 2 with respect to the pulsing operation of transformer 70. The secondary of transformer 70 is connected in series with diode 90 across resistor 92 which resistor is in series with the gap. With switch 82 in its closed position, roughing operation is enabled responsive to alternate triggering of controlled rectifiers 58 and 60. Because of the two current paths provided through the transformer secondary and resistor 92, the transformer secondary must have a relatively heavy secondary winding to carry the necessary cutting current. The output circuit will operate for finishing in a highly satisfactory manner when switch 82 is opened.

Figure 4:
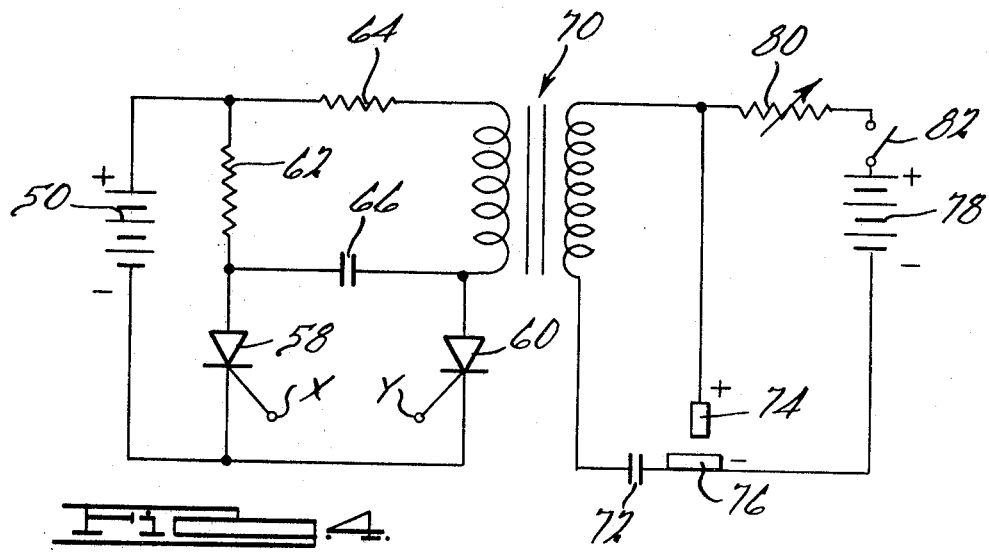

The circuit of FIGURE 4 differs from the circuit of FIGURE 2 in that transformer has its primary connected in series with controlled rectifier 60 rather than in parallel. The switching of controlled rectifiers 58, 60 can be made to occur at a higher frequency because of the inductive effect of transformer 70. Higher voltage controlled rectifiers may be used as compared to those of FIGURES 2 and 3 to give a higher voltage output spike. Resistor 80 is used to control cutting current to the gap in rough machining. In finish machining, switch 82 is opened and cutting is again conducted with low current pulses.

Figure 5:
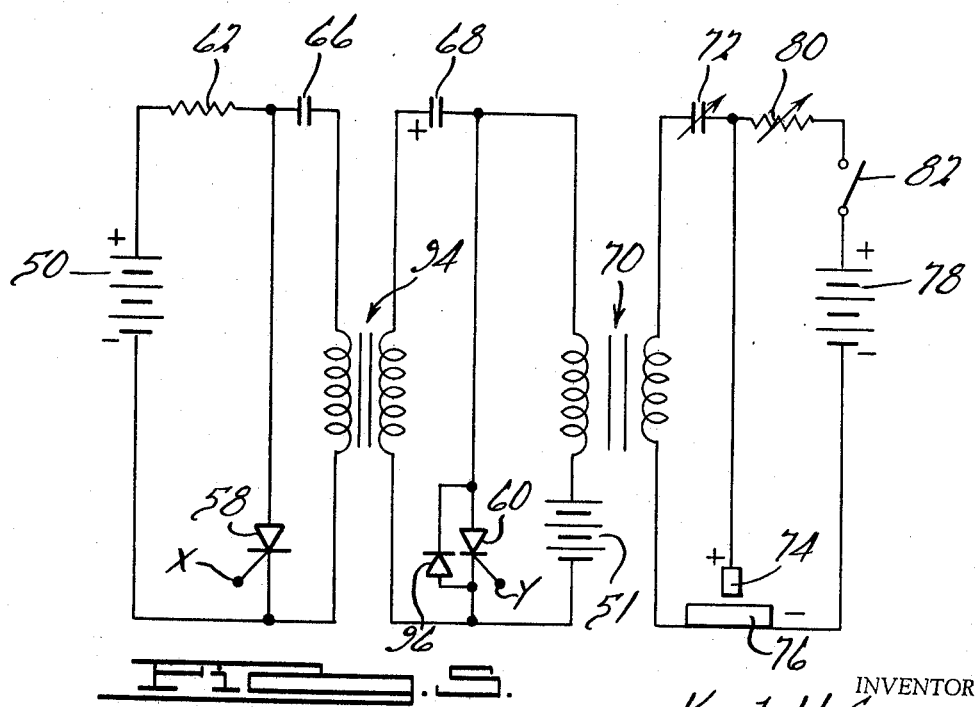

The circuit of FIGURE 5 has an output stage including transformer 70 which is the same as that in the circuit of FIGURE 2. A transformer 94 is included between the two controlled rectifiers for isolation purpores. Because of this isolation, the breakover voltages of controlled rectifiers 58, 60 are dependent only on their respective power supplies 50, 51. This circuit can be switched at reasonably high frequencies since the charging rate of the pulse generator can be increased by decreasing the magnitude of capacitor 66.

In the operation of the circuit of FIGURE 5, controlled rectifiers 58, 60 are alternately triggered on at their respective gate electrodes by the multivibrator output pulses. Capacitor 66 will charge to the voltage of source 50 through resistor 62. If controlled rectifier 58 is then triggered on, capacitor 66 will discharge to pulse transformer 94. If controlled rectifier 60 is conducting load current, capacitor 68 will receive an initial charge of the polarity indicated. When this charging pulse goes negative, it will aid the capacitor shunt circuit in shunting load current away from controlled rectifier 60. A protective diode 96 is connected in parallel with the cathode and anode of controlled rectifier 60. If the shunting transient is of sufficient duration and magnitude, it will turn off controlled rectifier 60. Since sustaining current cannot be supplied to controlled rectifier 58, it will also turn off. The next triggering pulse from the multivibrator will trigger controlled rectifier 60 into conduction and the cycle is set to repeat. As the controlled rectifiers are alternately triggered on and turned off, transformer 70 will provide pulses to charge capacitor 72 and discharge it into the arc to provide controlled arc turn-off by extinguishing supply 78. The circuit of FIGURE 5, like the previous circuits, can be operated in the long on-time roughing mode with switch 82 closed or in the low current finishing mode with switch 82 opened.

It will thus be seen that by my invention I have provided a new and improved power supply for electrical discharge machining with the capability of both roughing and finishing operations.

I claim:

1. In an electrical discharge machining apparatus for machining a conductive workpiece by a tool electrode across a dielectric coolant filled gap, a machining power circuit including a first power supply connected across said gap wherein the improvement comprises a transformer having a primary and a secondary winding, said secondary winding connected in series with a capacitor across said gap, a second power supply and an electronic switching means operatively connected to the primary of said transformer for periodically pulsing it to charge and discharge said capacitor to turn off said power supply and said gap for a short time duration whereby relatively long on-time machining pulses are furnished to said gap.

2. In an electrical discharge machining apparatus for machining a conductive workpiece by a tool electrode across a dielectric coolant filled gap, a machining power circuit for rough and finish machining including a power supply connectible across said gap wherein the improvement comprises a transformer having a primary and a secondary winding, a capacitor connected in series with said secondary winding across said gap, a second power supply and an electronic switching means operatively connected to said primary for periodically pulsing it to charge and discharge said capacitor to turn off said first power supply for a short time duration whereby relatively long on-time, high current machining current pulses are furnished to said gap and switching means connected in series between said first power supply and said gap, said switching means operable in its open condition to disconnect said first power supply from said gap whereby short duration, low current machining pulses are furnished to said gap.

3. In an electrical discharge machining apparatus for machining a conductive workpiece by a tool electrode across a dielectric coolant filled gap, a machining power circuit including a first power supply connected across said gap, wherein the improvement comprises a transformer including a primary and a secondary winding, said secondary winding operatively connected across said gap, a second power supply, an electronic triggering device having a gate electrode and a pair of principal electrodes, said principal electrodes operatively connected between said second power supply and said primary winding for periodically pulsing it to turn-off said first power supply and the gap, means connected to said gate electrode for periodically turning it on, and means operatively connected to one of said principal electrodes of said triggering device for turning it off.

4. The combination as set forth in claim 3 wherein a current limiting resistor is connected in series between said first power supply and said gap and wherein said secondary winding is connected in series with a diode across said resistor.

5. The combination as set forth in claim 3 wherein said first power supply is connected in series with a current-limiting resistor across said gap and wherein said secondary is connected in series with a capacitor across said gap.

6. The combination as set forth in claim 3 wherein said electronic triggering device comprises a controlled rectifier having its principal electrodes connected in series with said primary across said second power supply.

7. The combination as set forth in claim 3 wherein said electronic triggering device comprises a controlled rectifier and said turn-off means comprises a second controlled rectifier having a gate electrode and a pair of principal electrodes, said principal electrodes connected in series combination with a commutating capacitor, said series combination operatively connected to said principal electrodes of said first controlled rectifier.

8. The combination as set forth in claim 7 wherein said principal electrodes of said second controlled rectifier are connected in series with said commutating capacitor across said principal electrodes of said first controlled rectifier.

9. The combination as set forth in claim 7 wherein said principal electrodes of said first and second controlled rectifiers are coupled through the primary and secondary windings of an isolation transformer.

10. In an electrical discharge machining apparatus for machining a conductive workpiece by a tool electrode across a dielectric coolant filled gap, a machining power circuit comprising a first power source connected across said gap, wherein the improvement comprises an electronic triggering device having a gate electrode and a pair of principal electrodes, a transformer having a primary winding and a secondary winding, a second power source, said principal electrodes connected in series between said second power source and said primary winding, pulsing means connected to said gate electrode for triggering said triggering device on, means operatively connected to said principal electrodes of said triggering device for turning it off, said secondary winding operatively connected across said gap for providing spaced, brief time duration turn-off spikes to said first power source and said gap.

11. In an electrical discharge machining apparatus for machining a conductive workpiece by a tool electrode across a dielectric coolant filled gap, a machining power circuit comprising a first power source connected across said gap, wherein the improvement comprises a first controlled rectifier having a gate electrode and a pair of principal electrodes, a transformer having a primary winding and a secondary winding, a second power source, said principal electrodes operatively connected to said second power source and connected in series with a capacitor across said primary, pulsing means connected to said gate electrode for triggering said controlled rectifier on, and a second controlled rectifier operatively connected to said principal electrodes of said first controlled rectifier for turning it off, a capacitor, said secondary winding connected in series with said capacitor across said gap for providing spaced, brief time duration turn-off spikes to said first power source and said gap.

References Cited

UNITED STATES PATENTS 3,056,065 9/1962 Porterfield.
3,158,728 11/1964 Webb.
3,211,882 10/1965 Webb et al.

JOSEPH V. TRUHE, Primary Examiner

R. F. STAUBLY, Assistant Examiner

U.S. Cl. X.R.

315—225